US011661760B1

(12) United States Patent
Gao et al.

(10) Patent No.: US 11,661,760 B1
(45) Date of Patent: May 30, 2023

(54) LONGITUDINAL SEAM CAULKING AND MONITORING RESTORE DEVICE AND LONGITUDINAL SEAM CAULKING RESTORE METHOD

(71) Applicant: China Three Gorges Co., Ltd., Hubei (CN)

(72) Inventors: Chao Gao, Hubei (CN); Zhiwei Wang, Hubei (CN); Jie Yu, Hubei (CN); Chao Shang, Hubei (CN); Han Zhang, Hubei (CN); Bo Shao, Hubei (CN)

(73) Assignee: CHINA THREE GORGES CO., LTD., Hubei (CN)

( * ) Notice: Subject to any disclaimer, the term of this patent is extended or adjusted under 35 U.S.C. 154(b) by 0 days.

(21) Appl. No.: 17/742,084

(22) Filed: May 11, 2022

(30) Foreign Application Priority Data

Jan. 24, 2022 (CN) .......................... 202210076400.5

(51) Int. Cl.
E04H 9/02 (2006.01)
E04B 1/98 (2006.01)
(Continued)

(52) U.S. Cl.
CPC ............... *E04H 9/027* (2013.01); *E04B 1/98* (2013.01); *E04G 21/1841* (2013.01);
(Continued)

(58) Field of Classification Search
CPC ... E04B 1/98; E04G 21/1841; E04G 23/0203; E04H 9/027; E04H 9/0215; E04H 9/0235
See application file for complete search history.

(56) References Cited

U.S. PATENT DOCUMENTS 4,533,109 A * 8/1985 Delam .................... E01D 19/04
248/618
4,593,502 A * 6/1986 Buckle ...................... E04B 1/98
52/167.7
(Continued)

FOREIGN PATENT DOCUMENTS

CN 101887639 A 11/2010
CN 105675101 A 6/2016
(Continued)

OTHER PUBLICATIONS

Notification to Grant Patent Right for 202210076400.5, dated Mar. 7, 2022.
(Continued)

*Primary Examiner* — Jessie T Fonseca
(74) *Attorney, Agent, or Firm* — Christopher M. Scherer; DeWitt LLP

(57) ABSTRACT

The disclosure relates to the technical field of building structure engineering, in particular to a longitudinal seam caulking and monitoring restore device and a longitudinal seam caulking restore method. The longitudinal seam caulking and monitoring restore device includes: a first panel, on which a plurality of guide seats are arranged; a second panel, which is arranged to be opposite to the first panel; stranded wires, which are wound on the guide seats, wherein first ends of the stranded wires are connected to stranded wire end seats, the stranded wire end seats are fixedly connected to the second panel, second ends of the stranded wires extend out of a space between the second panel and the first panel and are connected to fastening devices, and the fastening devices are capable of tightening and releasing the stranded wires; a plurality of elastic components, wherein the elastic components are arranged between the first panel and the second panel, first ends of the elastic components are fixedly connected to the first panel, and second ends of the (Continued)

elastic components are fixedly connected to the second panel; and two groups of air columns, wherein a connection line of one group of air columns intersects another connection line of the other group of air columns to form a cross, each group of the air columns includes at least two air columns.

10 Claims, 7 Drawing Sheets

(51) Int. Cl.
    *G01L 7/02*    (2006.01)
    *E04G 23/02*   (2006.01)
    *E04G 21/18*   (2006.01)

(52) U.S. Cl.
    CPC ....... *E04G 23/0203* (2013.01); *E04H 9/0215* (2020.05); *E04H 9/0235* (2020.05); *G01L 7/02* (2013.01)

(56) References Cited

U.S. PATENT DOCUMENTS

| | | | | |
|---|---|---|---|---|
| 5,549,269 A | * | 8/1996 | Gertel | F16F 13/002 |
| | | | | 267/64.11 |
| 6,250,441 B1 | * | 6/2001 | Shimoda | F16F 9/103 |
| | | | | 267/136 |
| 8,570,183 B2 | | 10/2013 | Corrado | |
| 10,208,828 B2 | * | 2/2019 | Gaudet | F16F 9/512 |
| 10,837,192 B2 | * | 11/2020 | Moreno | E02D 31/08 |

FOREIGN PATENT DOCUMENTS

| | | | |
|---|---|---|---|
| CN | 107901916 A | | 4/2018 |
| CN | 110173130 A | | 8/2019 |
| CN | 110406539 A | | 11/2019 |
| CN | 110689723 A | | 1/2020 |
| CN | 113818713 A | | 12/2021 |
| CN | 215106154 U | | 12/2021 |
| CN | 114059695 A | * | 2/2022 |
| JP | 2011117253 A | | 6/2011 |
| KR | 20130093964 A | | 8/2013 |
| WO | WO-2012141378 A1 | * | 10/2012 ............... E04B 1/98 |

OTHER PUBLICATIONS

International Search Report and Written Opinion for PCT/CN2020/097335, dated Sep. 27, 2020, from the China National Intellectual Property Administration.

* cited by examiner

LONGITUDINAL SEAM CAULKING AND MONITORING RESTORE DEVICE AND LONGITUDINAL SEAM CAULKING RESTORE METHOD

CROSS-REFERENCE TO RELATED APPLICATIONS

The present application claims priority to Chinese Patent Application No. 202210076400.5, filed Jan. 24, 2022, the content of which is incorporated herein by reference in its entirety.

TECHNICAL FIELD

The present disclosure relates to the technical field of building structure engineering, in particular to a longitudinal seam caulking and monitoring restore device and a longitudinal seam caulking restore method.

BACKGROUND

Seams caused by fabrication errors, mounting process requirements, etc., are commonly found in traditional and modern building structures, especially longitudinal seams perpendicular to the ground are widely found in traditional building beam-column mortise and tenon nodes and modern building assembly structures. It is a common working condition that a structural member has a seam when in use; during the long service life, the self weight, seismic load, etc., may enlarge the seam; and the influence of environmental factors on a material may also enlarge the seam between structural members. A large seam may lead to the loosening of the connection of the structural members, and lead to the horizontal swing and even torsion of the structural members during an earthquake, which is extremely unfavorable to the seismic resistance of a building. Although some longitudinal seams are strengthened or reinforced by adding caulking devices, similar devices have a single function and a limited caulking effect, which does not meet the seismic resistance requirement of a building structure well.

SUMMARY

Therefore, a technical problem to be solved by the present disclosure is to overcome the defect that a longitudinal seam caulking device in the prior art has a poor caulking effect, so as to provide a longitudinal seam caulking and monitoring restore device that has a good caulking effect and can meet the seismic resistance requirement of a building structure, and a longitudinal seam caulking restore method.

In order to solve the above technical problem, the present disclosure provides a longitudinal seam caulking and monitoring restore device, including: a first panel, on which a plurality of guide seats are arranged; a second panel, which is arranged to be opposite to the first panel; stranded wires, which are wound on the guide seats, wherein first ends of the stranded wires are connected to stranded wire end seats, the stranded wire end seats are fixedly connected to the second panel, second ends of the stranded wires extend out of a space between the second panel and the first panel and are connected to fastening devices, and the fastening devices are capable of tightening and releasing the stranded wires; four elastic components, wherein the elastic components are arranged between the first panel and the second panel and are respectively close to corners of the second panel, first ends of the elastic components are fixedly connected to the first panel, and second ends of the elastic components are fixedly connected to the second panel; and two groups of air columns, wherein a connection line of one group of air columns intersects another connection line of the other group of air columns to form a cross, each group of the air columns includes two air columns, the first panel is provided with air channels corresponding to the respective air columns and air slots communicating with first ends of the air channels, the air columns are resilient hollow columns having first ends with openings and second ends being closed, the first panel is provided with first limit slots surrounding the air slots, the first ends of the air columns are embedded in the first limit slots and the openings are opposite to the air slots, the second ends of the air columns abut against the second panel, second ends of the air channels are provided with air nozzles, and the air nozzles are connected to air pressure gauges.

Optionally, each of the elastic components is correspondingly provided with one of the stranded wires, the center of the first end of each of the elastic components is provided with one of the guide seats, the center of the second end of each of the elastic components is provided with one of the stranded wire end seats, and the stranded wires pass through the first ends of the elastic components, are wound around the guide seats and then are arranged inside the elastic components in a manner of being colinear with central axes of the elastic components.

Optionally, each of the elastic components includes a spring seat and a spring, the spring seat is fixedly arranged on the first panel, one end of the spring is arranged on the spring seat, the other end of the spring is fixedly connected to the second panel, the spring seat includes an annular body and a plurality of supporting legs connected to the annular body, and a space between two adjacent supporting legs is configured for a corresponding stranded wire to pass through.

Optionally, each of the stranded wire end seats includes a connection seat and a fixture fixedly connected to the connection seat, one end of each of the stranded wires is fixed in a corresponding fixture, and the connection seat is fixedly connected to the second panel.

Optionally, each of the guide seats is provided with a central through hole and at least two guide bottom holes communicating with the central through hole, the guide bottom holes are formed in one end of each of the guide seats connected to the first panel, each of the stranded wires passes through the central through hole and one of the guide bottom holes or passes through two of the guide bottom holes sequentially.

Optionally, the first panel is provided with mounting holes, and each of the fastening device includes: a rotation shaft, which is rotatably arranged in each of the mounting holes, the second end of each of the stranded wires being fixedly connected to the rotation shaft; and a drive structure, which is connected to the rotation shaft, and capable of driving the rotation shaft to rotate around an axis thereof.

Optionally, the drive structure includes: a worm wheel, which is fixedly arranged on the rotation shaft; a bracket, which is fixedly connected to the first panel and located on one side of the worm wheel; a worm shaft, which is rotatably arranged in the bracket and engaged with the worm wheel; and a knob, which is connected to one end of the worm shaft and located outside the bracket.

Optionally, the first panel has a bubble level connected thereon, and a level tube of the bubble level is parallel to a long side of the first panel.

Optionally, the second panel is provided with second limit slots, and the second ends of the air columns are embedded in the second limit slots.

The present disclosure further provides a longitudinal seam caulking restore method, applied to the longitudinal seam caulking and monitoring restore device, the longitudinal seam caulking restore method including:

S1. operating fastening devices to tighten stranded wires such that a distance between a first panel and a second panel is reduced, and a distance between one side of the first panel away from the second panel and one side of the second panel away from the first panel is less than a width of a to-be-caulked longitudinal seam;

S2. inserting the longitudinal seam caulking and monitoring restore device into the longitudinal seam, operating the fastening devices to release the stranded wires such that the first panel and the second panel respectively abut against side walls of the longitudinal seam under the action of elastic components;

S3. adjusting a position of the longitudinal seam caulking and monitoring restore device in the longitudinal seam such that a bubble in the bubble level is centered;

S4. operating again the fastening devices to release the stranded wires such that the first panel and the second panel respectively abut tightly against the side walls of the longitudinal seam under the action of the elastic components;

S5. zeroing indications of air pressure gauges;

after the longitudinal seam suffers from a change in position and shape, the longitudinal seam caulking restore method further including:

S6. reading the indications of the air pressure gauges, and performing conversion according to the indications of the air pressure gauges to obtain a horizontal swing amplitude and a torsion angle of a structural member; and S7. operating a plurality of fastening devices respectively to tighten or release the stranded wires to adjust deformations of the elastic components until the indications of the air pressure gauges become zero, so as to support shifting of the structural member in the longitudinal seam by means of the deformations of the elastic components at respective positions, and to adjust the position of the structural member in the longitudinal seam.

The technical solution of the present disclosure has the following advantages.

According to the longitudinal seam caulking and monitoring restore device provided in the present disclosure, the stranded wire end seats are fixedly connected to the second panel, the stranded wires are wound on the guide seats, the guide seats are fixedly arranged on the first panel, and when the fastening devices tighten the stranded wires, the second panel is pulled by means of the stranded wire end seats, so that the second panel approaches the first panel, and the distance between the second panel and the first panel is reduced, and the elastic components are compressed during the process. When the distance between one side of the first panel away from the second panel and one side of the second panel away from the first panel is less than the width of the to-be-caulked longitudinal seam, the longitudinal seam caulking and monitoring restore device can be easily inserted into the longitudinal seam. After the longitudinal seam caulking and monitoring restore device is inserted into the longitudinal seam, the fastening devices release the stranded wires so that the first panel and the second panel respectively abut tightly against the side walls of the longitudinal seam under the action of the elastic force of the elastic components. The longitudinal seam caulking and monitoring restore device can be applied to the caulking of longitudinal seams with different widths, and is highly versatile. When there is a change in position and shape of the longitudinal seam due to an earthquake or an external force, the first panel and the second panel can be kept to abut against the side walls of the longitudinal seam under the action of the elastic force of the elastic components, and the elastic force of the elastic components can fend off the tendency of node deformation, thereby meeting seismic resistance requirements of a building structure. By arranging two groups of air columns, when an earthquake occurs, the elastic force of the elastic components can fend off the tendency of node deformation, and damping is produced by exhausting and inhalation processes of the air columns, which can dissipate the energy in a node deformation process during the earthquake, and meanwhile, reduce the compression speeds of the elastic components and mitigate the shaking intensity of the building. The prior experimental simulation is performed to obtain a relationship between a differential pressure generated by one group of air columns located in a longitudinal direction and a torsion angle of the structural member, and a relationship between a differential pressure generated by one group of air columns located in a horizontal direction and a horizontal swing amplitude of the structural member, and the horizontal swing amplitude and the torsion angle of the structural member can be derived according to changes in the indications of the air pressure gauges so as to measure a change in position and shape of the longitudinal seam, and an external pushing force is provided to the first panel and the second panel by releasing the elastic force of the elastic components, thereby achieving the effect of supporting restoration of the structural member by the longitudinal seam caulking and monitoring restore device.

BRIEF DESCRIPTION OF THE DRAWINGS

In order to more clearly explain the technical solutions in the specific embodiments of the present disclosure or in the prior art, the following will briefly introduce the drawings that are required to be used in the description of the specific embodiments or the prior art. Obviously, the drawings in the following description are some embodiments of the present disclosure, and those of ordinary skill in the art may also obtain other drawings according to these drawings without inventive efforts.

Figure 1:
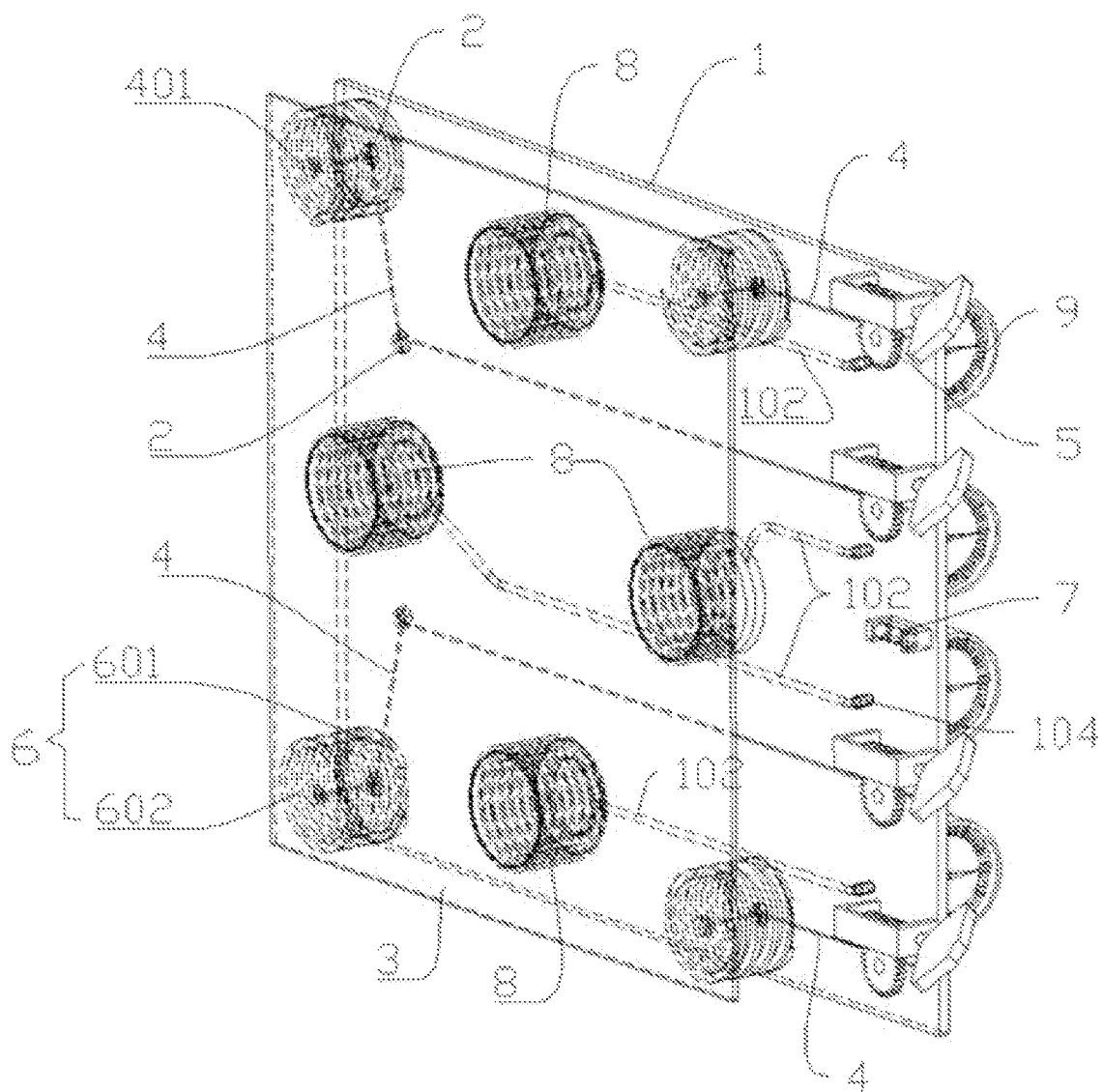
FIG. 1 is a perspective view showing a structural diagram of a longitudinal seam caulking and monitoring restore device provided in Embodiment 1 of the present disclosure.
Figure 2:
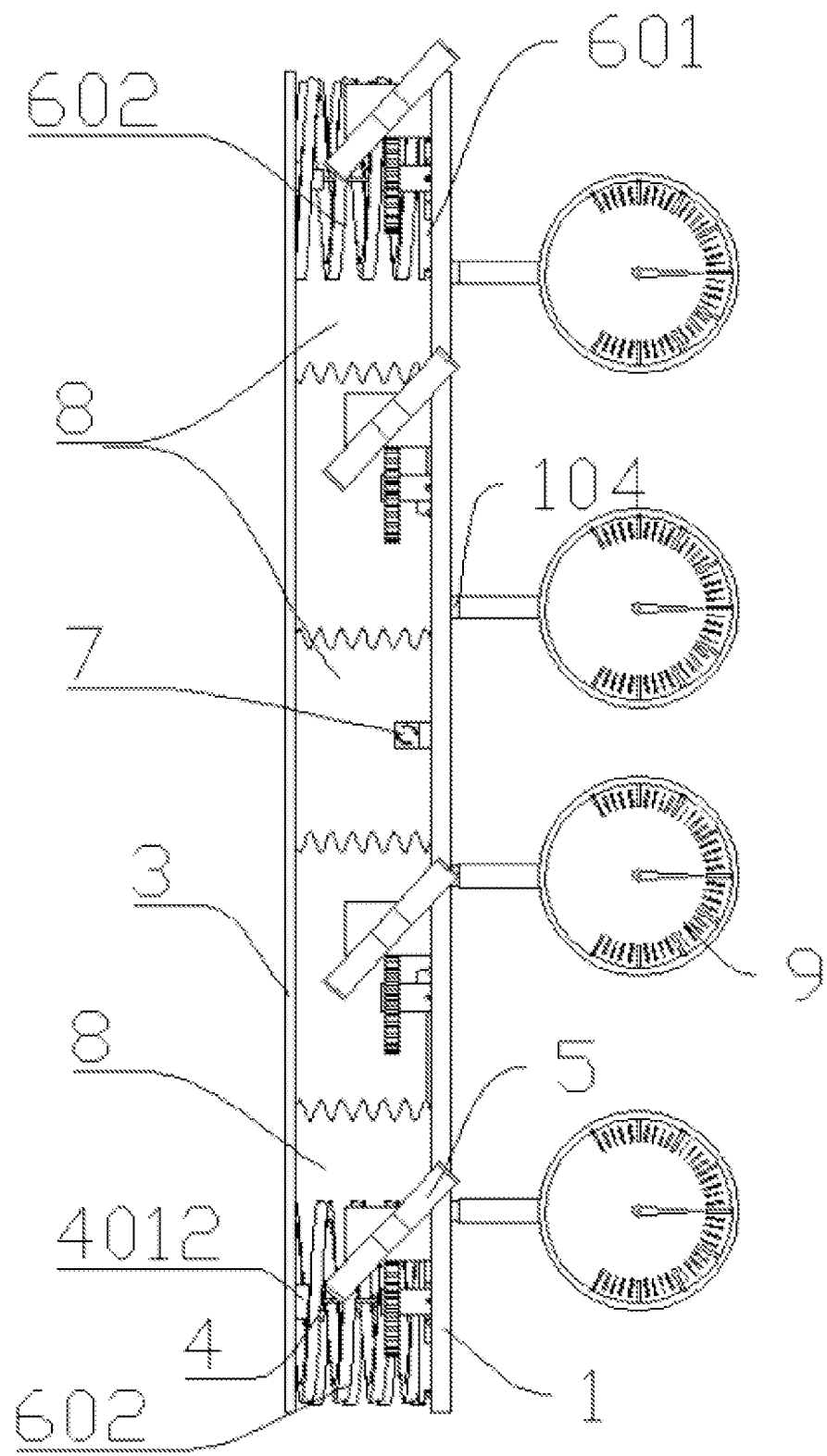
FIG. 2 is a front view of the longitudinal seam caulking and monitoring restore device provided in Embodiment 1 of the present disclosure.

DESCRIPTION OF REFERENCE SIGNS 1, first panel; 101, mounting hole; 102, air channel; 103, air slot; 104, air nozzle; 105, first limit slot; 2, guide seat;

201, central through hole; 202, guide bottom hole; 3, second panel; 301, second limit slot; 4, stranded wire; 401, stranded wire end seat; 4011, connection seat; 4012, fixture; 5, fastening device; 501, rotation shaft; 5011, stranded wire hole; 502, worm wheel; 503, bracket; 504, worm shaft; 505, knob; 6, elastic component; 601, spring seat; 6011, annular body; 6012, supporting leg; 602, spring; 7, bubble level; 8, air column; 9, air pressure gauge; 10, cross beam.

DETAILED DESCRIPTION

The technical solutions of the present disclosure will be clearly and completely described below in conjunction with the drawings. Obviously, the described embodiments are only some embodiments of the present application, and not all embodiments. All other embodiments derived by those of ordinary skill in the art on the basis of the embodiments of the present disclosure without creative efforts fall within the protection scope of the present disclosure.

In the description of the present disclosure, it should be noted that, an orientation or position relationship indicated by terms such as "center", "up", "down", "left", "right", "vertical", "horizontal", "inside" and "outside" is based on an orientation or position relationship shown in the drawings, which is only for the convenience of describing the present application and simplifying the description, rather than indicating or implying that an device or element referred to needs to have a specific orientation or be constructed and operated in a specific orientation, so that the terms cannot be understood as a limitation on the present disclosure. In addition, the terms "first", "second" and "third" are only used for descriptive purposes, and cannot be understood as indicating or implying relative importance.

In the description of the present disclosure, it should be noted that the terms "mount", "connect", "connection" should be broadly understood unless otherwise specified and defined, for example, it may be a fixed connection or a removable connection, or an integral connection, may be a mechanical connection or an electrical connection, or may be a direct connection, or an indirect connection through an intermediate medium, or may be an internal connection between two elements. For those of ordinary skill in the art, the specific meanings of the above terms in the present disclosure may be interpreted according to particular situations.

In addition, the technical features involved in the different embodiments of the present disclosure described below can be combined with each other as long as they do not constitute a conflict.

Embodiment 1

Seams caused by fabrication errors, mounting process requirements, etc., are commonly found in traditional and modern building structures, especially longitudinal seams perpendicular to the ground are widely found in traditional building beam-column mortise and tenon nodes and modern building assembly structures. It is a common working condition that a structural member has a seam when in use; during the long service life, the self weight, seismic load, etc., may enlarge the seam; and the influence of environmental factors on a material may also enlarge the seam between structural members. A large seam may lead to the loosening of the connection of the structural members, and lead to the horizontal swing and even torsion of the structural members during an earthquake, which is extremely unfavorable to the seismic resistance of a building. Although some longitudinal seams are strengthened or reinforced by adding caulking devices, similar devices have a single function and a limited caulking effect, which does not meet the seismic resistance requirement of a building structure well.

Therefore, an embodiment provides a longitudinal seam caulking and monitoring restore device, which has a good caulking effect and can meet a seismic resistance requirement of a building structure.

In an embodiment, as shown in FIGS. 1 to 8, a longitudinal seam caulking and monitoring restore device includes a first panel 1, a second panel 3, stranded wires 4, elastic components 6 and air columns 8. A plurality of guide seats 2 are arranged on the first panel 1; the second panel 3 is arranged to be opposite to the first panel 1; the stranded wires 4 are wound on the guide seats 2, first ends of the stranded wires 4 are connected to stranded wire end seats 401, the stranded wire end seats 401 are fixedly connected to the second panel 3, second ends of the stranded wires 4 extend out of a space between the second panel 3 and the first panel 1 and are connected to fastening devices 5, and the fastening devices 5 are capable of tightening and releasing the stranded wires 4; a plurality of elastic components 6 are arranged between the first panel 1 and the second panel 3, first ends of the elastic components 6 are fixedly connected to the first panel 1, and second ends of the elastic components 6 are fixedly connected to the second panel 3; and two groups of air columns are arranged, a connection line of one group of air columns 8 intersects another connection line of the other group of air columns 8 to form a cross, each group of the air columns 8 includes two air columns 8, the first panel 1 is provided with air channels 102 corresponding to the respective air columns 8 and air slots 103 communicating with first ends of the air channels 102, and the air columns 8 are resilient hollow column having first ends with openings and second ends being closed; and the first panel 1 is provided with first limit slots 105 surrounding the air slots 103, the first ends of the air columns 8 are embedded in the first limit slots 105 and the openings are opposite to the air slots 103, the second ends of the air columns 8 abut against the second panel 3, second ends of the air channels 102 are provided with air nozzles 104, and the air nozzles 104 are connected to air pressure gauges 9.

In the embodiment, the stranded wire end seats 401 are fixedly connected to the second panel 3, the stranded wires 4 are wound on the guide seats 2, the guide seats 2 are fixedly arranged on the first panel 1, and when the fastening devices 5 tighten the stranded wires 4, the second panel 3 is pulled by means of the stranded wire end seats 401, so that the second panel 3 approaches the first panel 1, a distance between the second panel 3 and the first panel 1 is reduced, and the elastic components 6 are compressed during the process. When a distance between one side of the first panel 1 away from the second panel 3 and one side of the second panel 3 away from the first panel 1 is less than a width of a to-be-caulked longitudinal seam, the longitudinal seam caulking and monitoring restore device can be easily inserted into the longitudinal seam. After the longitudinal seam caulking and monitoring restore device is inserted into the longitudinal seam, the fastening devices 5 release the stranded wires 4 so that the first panel 1 and the second panel 3 respectively abut tightly against side walls of the longitudinal seam under the action of the elastic force of the elastic components 6. The longitudinal seam caulking and monitoring restore device can be applied to the caulking of longitudinal seams with different widths, and is highly versatile. When there is a change in position and shape of the longitudinal seam due to an earthquake or an external force, the first panel 1 and the second panel 3 can be kept to abut against the side walls of the longitudinal seam under the action of the elastic force of the elastic components 6, and the elastic force of the elastic components 6 can fend off the tendency of node deformation, thereby meeting seismic resistance requirements of a building structure. By arranging two groups of air columns 8, when an earthquake occurs, the elastic force of the elastic components 6 can fend off the tendency of node deformation, and damping is produced by exhausting and inhalation processes of the air columns, which can dissipate the energy in a node deformation process during the earthquake, meanwhile, reduce the compression speeds of the elastic components 6 and mitigate the shaking intensity of the building. The prior experimental simulation is performed to obtain a relationship between a differential pressure generated by one group of air columns 8 located in a longitudinal direction and a torsion angle of a structural member, and a relationship between a differential pressure generated by one group of air columns 8 located in a horizontal direction and a horizontal swing amplitude of the structural member, and the horizontal swing amplitude and the torsion angle of the structural member can be derived according to changes in indications of the air pressure gauges 9 so as to measure a change in position and shape of the longitudinal seam, and an external pushing force is provided to the first panel 1 and the second panel 3 by releasing the elastic force of the elastic components 6, thereby achieving the effect of supporting restoration of the structural member by the longitudinal seam caulking and monitoring restore device.

The stranded wires 4 may be steel stranded wires, or may also be metal wires or plastic wires having a good tensile capacity. Steel stranded wires are preferable in the embodiment.

Figure 4:
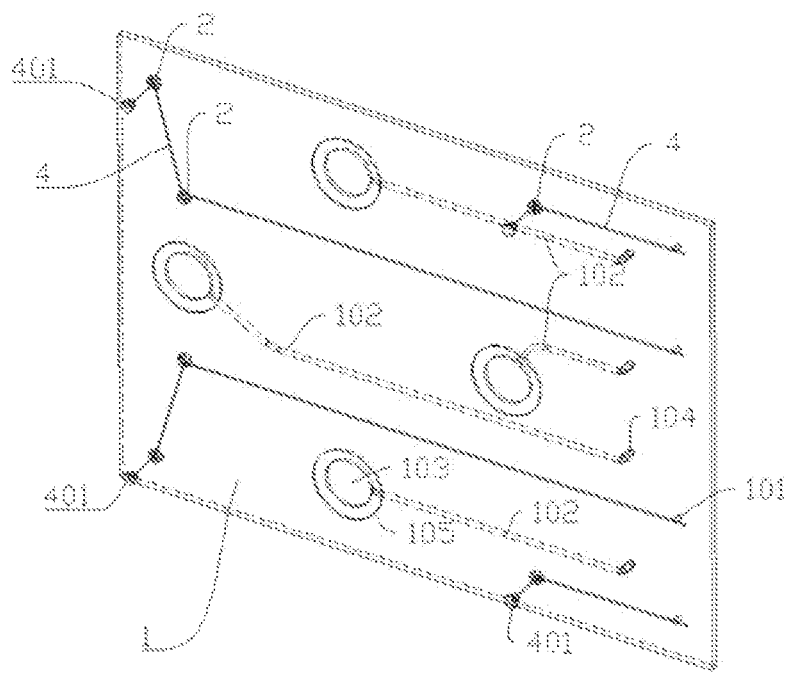
FIG. 4 is a structural diagram of a first panel of FIG. 1.
Figure 5:
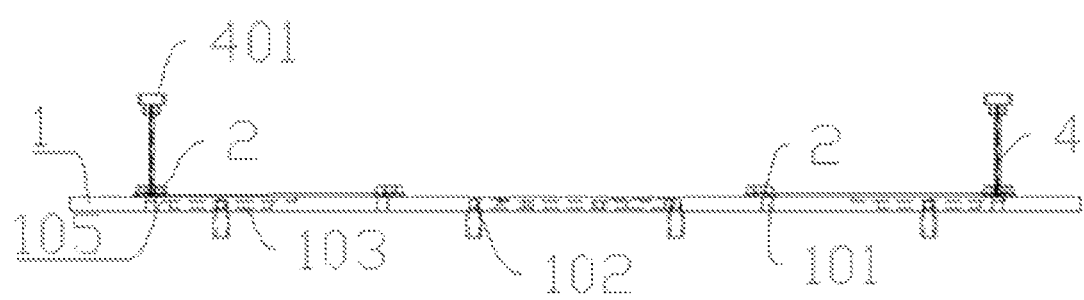
FIG. 5 is a front view of the first panel of FIG. 1.

As shown in FIG. 4, the first limit slots 105 are annular slots, depths of the first limit slots 105 are smaller than depths of the air slots 103, and the first limit slots 105 are provided to facilitate the limitation and fixation on the first ends of the air columns 8.

On the basis of the above embodiment, in a preferred embodiment, each of the elastic components 6 is correspondingly provided with one of the stranded wires 4, the center of the first end of each of the elastic components 6 is provided with one of the guide seats 2, the center of the second end of each of the elastic components 6 is provided with one of the stranded wire end seats 401, and the stranded wires 4 pass through the first ends of the elastic components 6, are wound around the guide seats 2 and then are arranged inside the elastic components 6 in a manner of being colinear with central axes of the elastic components 6. In the embodiment, the guide seats 2 are arranged at the centers of the first ends of the elastic components 6, and the stranded wires 4 are arranged inside the elastic components 6 in a penetrating manner, so that on the one hand, the layout is more compact, and on the other hand, when a stranded wire 4 corresponding to one elastic component 6 is tightened or released, the distance between the first panel 1 and the second panel 3 at a corresponding point of the elastic component 6 can be adjusted. Therefore, by adjusting compressions of different elastic components 6, the first panel 1 is not parallel to the second panel 3, thereby adapting to a situation where side walls of the to-be-caulked longitudinal seam are not parallel. Of course, in another alternative embodiment, the guide seats 2 are all arranged on outer sides of the elastic components 6, but the guide seats 2 need to be as close as possible to the elastic components 6, for example, a guide seat 2 is arranged next to each of the elastic components 6.

On the basis of the above embodiment, in a preferred embodiment, each of the elastic components 6 includes a spring seat 601 and a spring 602. The spring seat 601 is fixedly arranged on the first panel 1, one end of the spring 602 is arranged on the spring seat 601, the other end of the spring 602 is fixedly connected to the second panel 3, the spring seat 601 includes an annular body 6011 and a plurality of supporting legs 6012 connected to the annular body 6011, and a space between two adjacent supporting legs 6012 is configured for a corresponding stranded wire 4 to pass through. In the embodiment, due to the arrangement of the spring seat 601, not only can the spring 602 be fixedly mounted, and also the corresponding stranded wire 4 can pass through the spring seat 601 conveniently. In an alternative embodiment, each of the elastic components 6 only includes a spring 602, and a corresponding stranded wire 4 passes through a gap of the spring 602 to enter an inside of the spring 602. In an alternative embodiment, each of the elastic components 6 includes a thicker spring block or spring washer.

On the basis of the above embodiment, in a preferred embodiment, each of the stranded wire end seats 401 includes a connection seat 4011 and a fixture 4012 fixedly connected to the connection seat 4011. One end of each of the stranded wires 4 is fixed in a corresponding fixture 4012, and the connection seat 4011 is fixedly connected to the second panel 3. In the embodiment, one end of each of the stranded wires 4 can be stably fixed by the corresponding fixture 4012. In an alternative embodiment, connection holes can be formed in the stranded wire end seats 401, so that one end of each of the stranded wires 4 passes through a corresponding connection hole and is knotted to be fixed.

Figure 7:
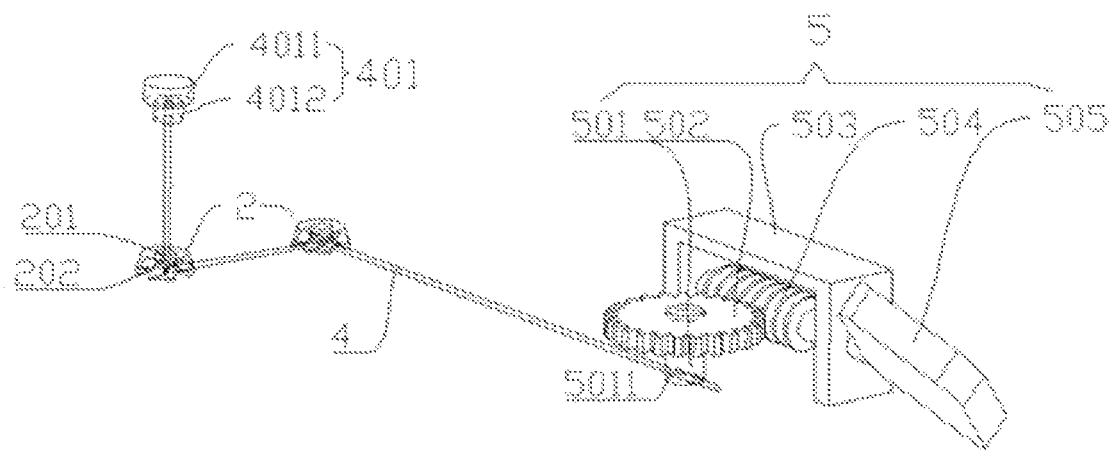
FIG. 7 is a structural diagram of a stranded wire, a guide seat connected to the stranded wire, and a fastening device.
Figure 8:
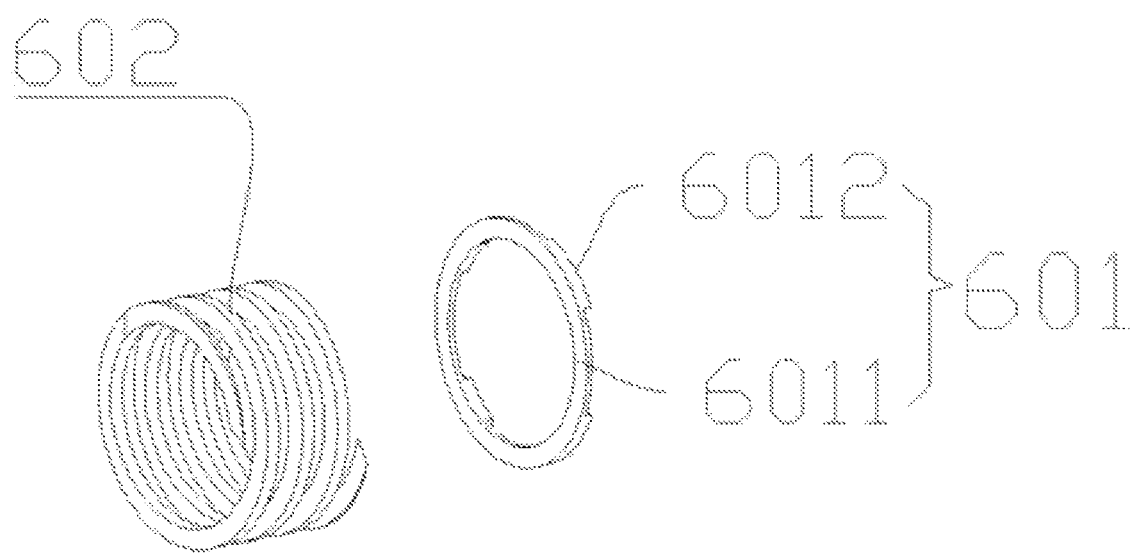
FIG. 8 is an exploded view of an elastic component.

As shown in FIG. 7, the connection seat 4011 is in a cylindrical shape, and the fixture 4012 is also in a cylindrical shape, and a diameter of the fixture 4012 is smaller than a diameter of the connection seat 4011.

On the basis of the above embodiment, in a preferred embodiment, each of the guide seats 2 is provided with a central through hole 201 and at least two guide bottom holes 202 communicating with the central through hole 201. The guide bottom holes 202 are formed in one end of each of the guide seats 2 connected to the first panel 1, each of the stranded wires 4 passes through the central through hole 201 and one of the guide bottom holes 202 or passes through two of the guide bottom holes 202 sequentially. In the embodiment, the respective guide seats 2 have the same structures. When each of the stranded wires 4 is arranged and mounted, whether each of the stranded wires 4 passes through the central through hole 201 and one of the guide bottom holes 202 or passes through two of the guide bottom holes 202 sequentially is selected according to the position of the corresponding guide seat 2. Specifically, as shown in the figures, when each of the guide seats 2 directly faces a corresponding stranded wire end seat 401, and each of the stranded wires 4 passes through the central through hole 201 and one of the guide bottom holes 202, so that a direction of each of the stranded wires 4 can be changed from a direction perpendicular to the first panel 1 to a direction parallel to the first panel 1; when each of the guide seats 2 does not directly face the corresponding stranded wire end seat 401, each of the stranded wires 4 passes through two of the guide bottom holes 202 sequentially, so that each of the stranded wires 4 remains parallel to the first panel 1. It should be noted that when a stranded wire end seat 401 of one stranded wire 4 is close to a fastening device 5 connected thereto, only a guide seat 2 facing the stranded wire end seat 401 is required to be arranged; when a stranded wire end seat 401 of one stranded wire 4 is far away from a fastening device 5 connected thereto, a plurality of guide seats 2 can be arranged such that one of the guide seats 2 faces the stranded end seat 401.

On the basis of the above embodiment, in a preferred embodiment, the first panel 1 is provided with mounting holes 101, and the fastening devices 5 include: rotation shafts 501 and drive structures. The rotation shafts 501 are rotatably arranged in the mounting holes, the second ends of the stranded wires 4 are fixedly connected to the rotation shafts 501; and the drive structures are connected to the rotation shafts 501, and capable of driving the rotation shafts 501 to rotate around axes thereof. In the embodiment, when the drive structures drive the rotation shafts 501 to rotate around axes thereof, since the second ends of the stranded wires 4 are fixedly connected to the rotation shafts 501, the stranded wires 4 are wound around the rotation shaft 501 during the rotation of the rotation shafts 501, thereby tightening the stranded wires 4 or releasing the stranded wires 4 from the rotation shafts 501. In an alternative embodiment, each of the fastening devices 5 may be a winch or be of a winch-like structure. In another alternative embodiment, the fastening devices 5 include drive structures and sliding blocks capable of doing reciprocating movement under the driving of the drive structures, the second ends of the stranded wires 4 are fixed to the sliding blocks, and the sliding blocks drive the stranded wires 4 to be tightened or released when moving.

As shown in FIG. 7, the rotation shafts 501 are provided with stranded wire holes 5011, the stranded wires 4 pass through and are fixed in the stranded wire holes 5011, and each of the stranded wire holes 5011 may be perpendicular to the axis of a corresponding rotation shaft 501 or may form an angle with the axis of the rotation shaft 501. In an alternative embodiment, each of the stranded wires 4 can be wound around the corresponding rotation shaft 501 in one turn and is knotted to be fixed.

On the basis of the above embodiment, in a preferred embodiment, each of the drive structures includes a worm wheel 502, a bracket 503, a worm shaft 504 and a knob 505. The worm wheel 502 is fixedly arranged on the corresponding rotation shaft 501; the bracket 503 is fixedly connected to the first panel 1 and located on one side of the worm wheel 502; the worm shaft 504 is rotatably arranged in the bracket 503 and engaged with the worm wheel 502; and the knob 505 is connected to one end of the worm shaft 504 and located outside the bracket 503. In the embodiment, the worm shaft 504 may be driven to rotate in the process of rotating the knob 505, and the worm shaft 504 is engaged with the worm wheel 502, so that the worm wheel 502 may be driven to rotate around an axis thereof, and the rotation shaft 501 may be driven to rotate in turn. When the rotation shaft 501 rotates, the corresponding stranded wire 4 is wound around the rotation shaft 501, so that the stranded wire 4 is tightened or the stranded wire 4 is released from the rotation shaft 501. In the embodiment, the stranded wire 4 is tightened or released by the simple action of rotating the knob 505, which is simple in structure and easy to operate manually. In an alternative embodiment, each of the drive structures may only include a knob 505 that is directly and coaxially connected to a corresponding rotation shaft 501. In the embodiment, the knob 505 needs to be operated on one side of the first panel 1 away from the second panel 3.

To facilitate the fixed installation of the fastening devices 5, an area of the first panel 1 is larger than an area of the second panel 3, and both the first panel 1 and the second panel 3 are rectangular. During installation, a short edge of the first panel 1 and a short edge of the second panel 3 are parallel and level, and a length of the first panel 1 is greater than a length of the second panel 3, so that the other short edge of the first panel 1 may protrude relative to the other short edge of the second panel 3, and a portion of the first panel 1 larger than the second panel 3 can be used for the installation of the fastening devices 5. When the longitudinal seam caulking and monitoring restore device is inserted into the to-be-caulked longitudinal seam, an edge of the first panel 1 parallel and level to the second panel 3 is inserted into the longitudinal seam, and an edge of the first panel 1 protruding relative to the second panel 3 is located outside the longitudinal seam. Thus, the fastening devices 5 can be easily operated.

Figure 3:
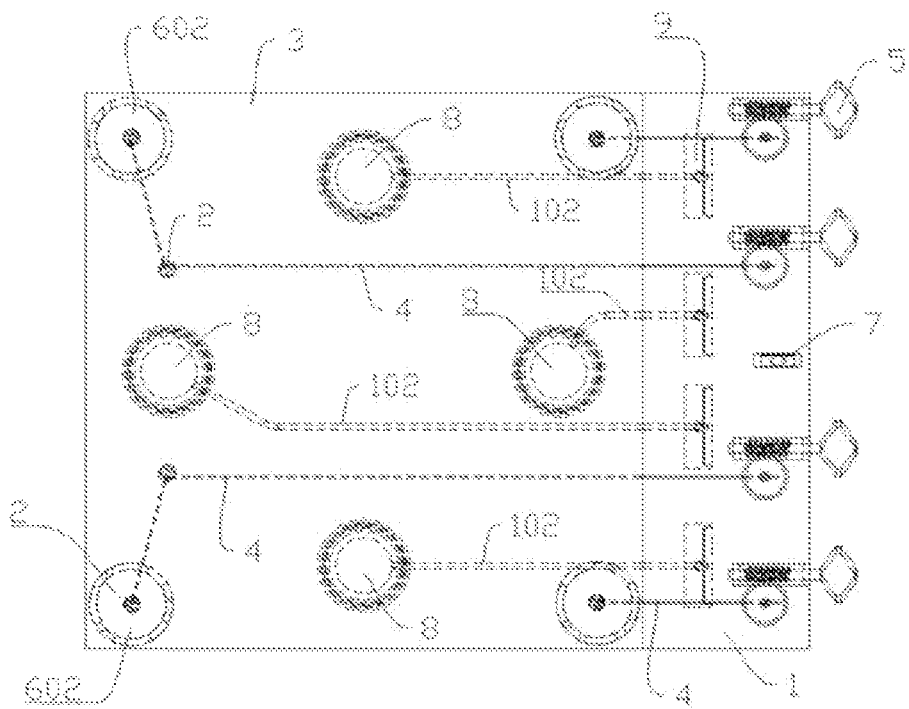
FIG. 3 is a top perspective view of the longitudinal seam caulking and monitoring restore device provided in Embodiment 1 of the present disclosure.

As shown in FIGS. 1 and 3, the knob 505 protrudes from one end of the first panel 1, which facilitates manual operation. Further referring to FIG. 1, two side surfaces of the knob 505 are in a rhombus shape, and have a larger contact area with a human hand, which is more suitable for the operation of the knob 505 in the process of rotating the knob 505. Further referring to FIGS. 1 and 7, the bracket 503 is in a U shape and includes two opposite side plates and a bottom plate connected to end portions of the two side plates, the worm shaft 504 is rotatably arranged between the two side plates, and one end of the worm shaft 504 extends out of one of the side plates to be connected to the knob 505.

On the basis of the above embodiment, in a preferred embodiment, the first panel 1 has a bubble level 7 connected thereon, and a level tube of the bubble level 7 is parallel to a long side of the first panel 1. In the embodiment, by arranging the bubble level 7, the levelness of the longitudinal seam caulking and monitoring restore device can be adjusted according to the bubble level 7.

As shown in FIG. 1, the bubble level 7 is arranged on the first panel 1 and is close to one end of the first panel 1 protruding from the second panel 3.

Longitudinal sections of the air columns 8 are corrugated. When the air columns 8 are compressed, air inside the air columns 8 is discharged through the air channels 102, and may produce changes in indications of the air pressure gauges 9 when passing through the air pressure gauges 9. When the air columns 8 dilate, inhalation is performed, air passes through the air pressure gauges 9 and the air channels 102 to enter the air columns 8, and the air passing through the air pressure gauges 9 may produce changes in the indications of the air pressure gauges 9. Since four elastic components 6 are arranged, four stranded wires 4 are arranged correspondingly.

On the basis of the above embodiment, in a preferred embodiment, the air nozzles 104 penetrate through the first panel 1, and the air pressure gauges 9 are arranged on one side away from the second panel 3. In the embodiment, such an arrangement can avoid interference between the air pressure gauges 9 and the fastening devices 5. Of course, in another alternative embodiment, in the case where interference does not occur, the air pressure gauges 9 and the fastening devices 5 may be arranged on the same side of the first panel 1.

In a preferred embodiment, the air nozzles 104 are perpendicular to the first panel 1.

Figure 6:
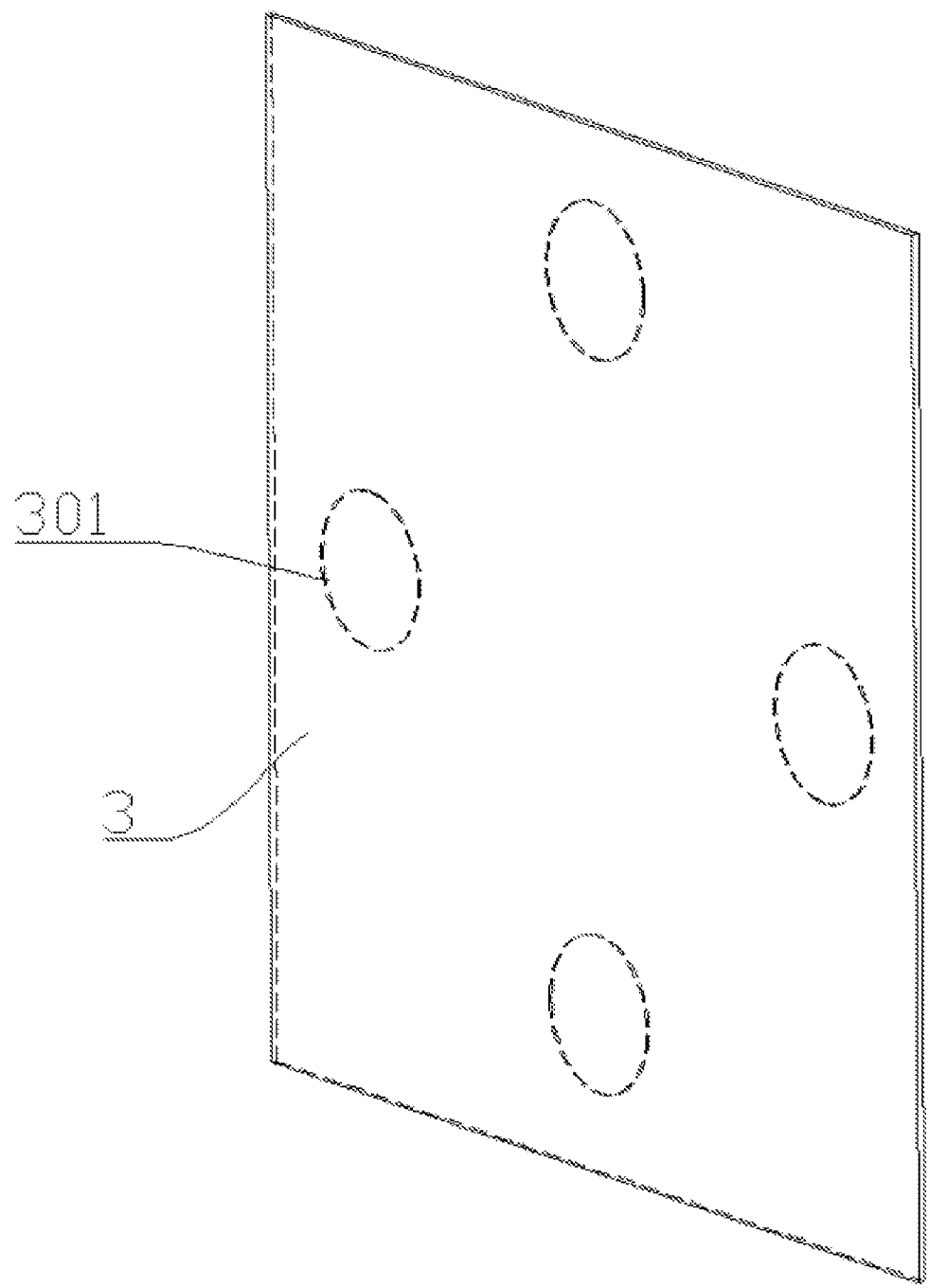
FIG. 6 is a structural diagram of a second panel of FIG. 1.

On the basis of the above embodiment, the second panel 3 is provided with second limit slots 301, and the second ends of the air columns 8 are embedded in the second limit slots 301. In the embodiment, the second limit slots 301 are form to facilitate the limitation and fixation on the second ends of the air columns 8. As shown in FIG. 6, the second limit slots 301 are circular slots.

Embodiment 2

The embodiment provides a longitudinal seam caulking restore method, applied to the longitudinal seam caulking and monitoring restore device provided in the above embodiments. The longitudinal seam caulking restore method includes the following steps.

S1. Fastening devices 5 are operated to tighten stranded wires 4 such that a distance between a first panel 1 and a second panel 3 is reduced, and a distance between one side of the first panel 1 away from the second panel 3 and one side of the second panel 3 away from the first panel 1 is less than a width of a to-be-caulked longitudinal seam. At this point, the first panel 1 and the second panel 3 can be easily inserted into the longitudinal seam. It should be noted that when each of the fastening devices 5 includes the rotation shaft 501, the worm wheel 502, the bracket 503, the worm shaft 504 and the knob 505, each of the stranded wires 4 is tightened by rotating a corresponding knob 505.

S2. The longitudinal seam caulking and monitoring restore device is inserted into the longitudinal seam, the fastening devices 5 are operated to release the stranded wires 4 such that the first panel 1 and the second panel 3 respectively abut against side walls of the longitudinal seam under the action of elastic components 6. After this step is completed, the first panel 1 and the second panel 3 are respectively in contact with the side walls of the longitudinal seam in a non-tight-abutting manner.

S3. A position of the longitudinal seam caulking and monitoring restore device is adjusted in the longitudinal seam such that a bubble in the bubble level 7 is centered. When the position of the longitudinal seam caulking and monitoring restore device is adjusted, the bubble in the bubble level 7 moves. The position of the longitudinal seam caulking and monitoring restore device is adjusted until the bubble in the bubble level 7 is centered. At this point, a connection line of one group of air columns 8 arranged in a vertical direction is perpendicular to the ground.

S4. The fastening devices 5 are operated again to release the stranded wires 4 such that the first panel 1 and the second panel 3 respectively abut tightly against the side walls of the longitudinal seam under the action of the elastic components 6. When each of the fastening devices 5 includes the rotation shaft 501, the worm wheel 502, the bracket 503, the worm shaft 504 and the knob 505, each of the stranded wires 4 is released by rotating a corresponding knob 505.

S5. Indications of air pressure gauges 9 become zero.

After an earthquake, if a structural member shakes to lead to a change in position and shape at a node, the longitudinal seam suffers from a change in position and shape. The above longitudinal seam caulking and monitoring restore device can be used to restore the node so as to further restore the structural member, and the longitudinal seam caulking restore method further includes the following steps.

S6. The indications of the air pressure gauges 9 are read, and conversion is performed according to the indications to obtain a horizontal swing amplitude and a torsion angle of the structural member. Specifically, the prior experimental simulation is performed to obtain a relationship between a differential pressure generated by one group of air columns 8 located in a longitudinal direction and a torsion angle of the structural member, and a relationship between a differential pressure generated by one group of air columns 8 located in a horizontal direction and a horizontal swing amplitude of the structural member, and the horizontal swing amplitude and the torsion angle of the structural member can be derived according to changes in the indications of the air pressure gauges 9.

Figure 9:
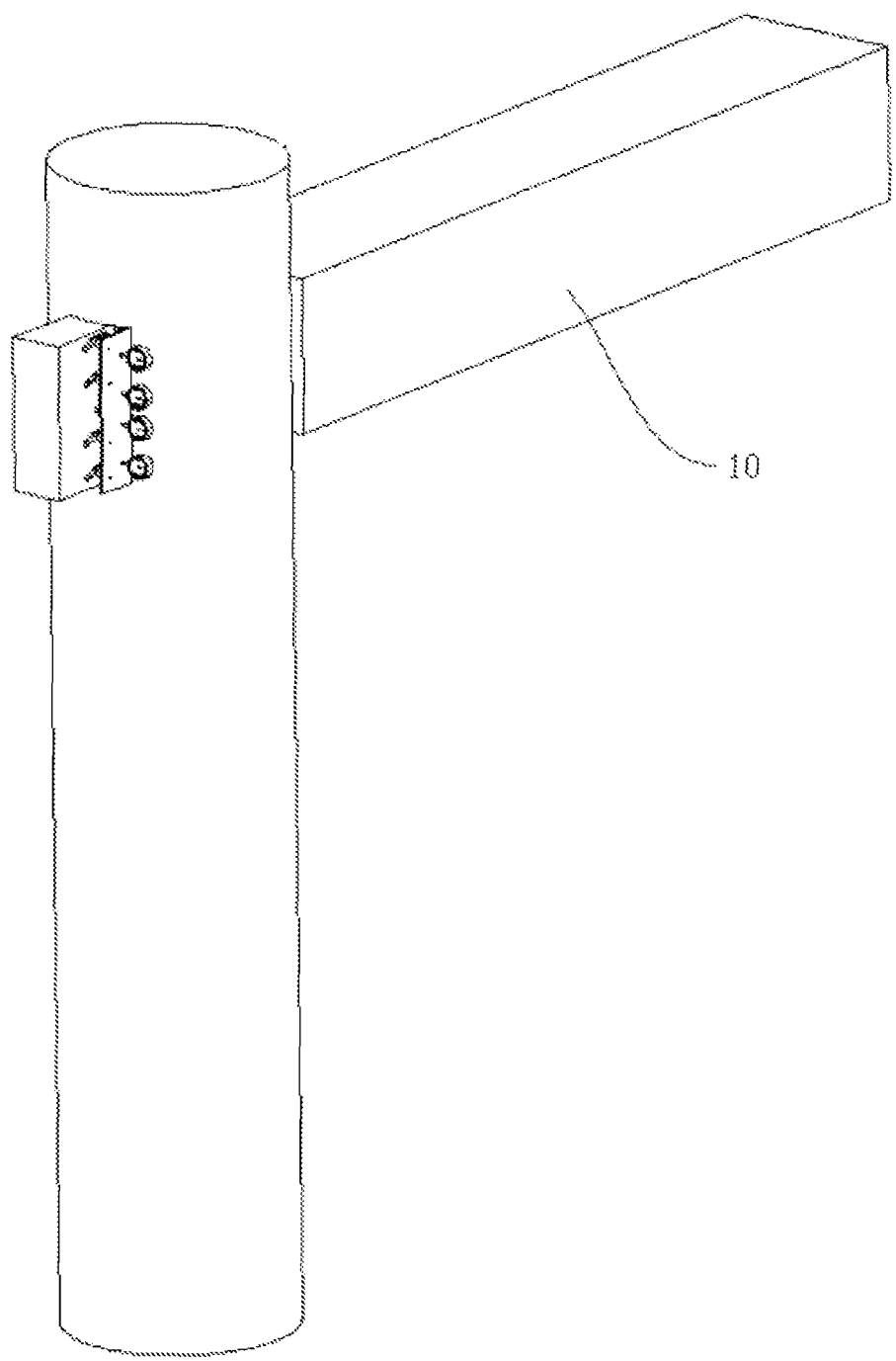
FIG. 9 is a structural diagram of insertion of the longitudinal seam caulking and monitoring restore device into a longitudinal seam.

S7. A plurality of fastening devices 5 are operated respectively to tighten or release the stranded wires 4 to adjust deformations of the elastic components 6 until the indications of the air pressure gauges 9 become zero, so as to support shifting of the structural member in the longitudinal seam by means of the deformations of the elastic components 6 at respective positions thereof, and to adjust the position of the structural member in the longitudinal seam. Regarding the horizontal swing deformation of the structural member, adjustment is mainly performed on deformations of two elastic components 6 perpendicular to the ground. Regarding the torsional deformation, adjustment is mainly performed on deformations of two elastic components 6 parallel to the ground. An external pushing force is provided to the first panel 1 and the second panel 3 by releasing the elastic force of the elastic components 6, thus achieving the effect of supporting restoration of the structural member by the longitudinal seam caulking and monitoring restore device. In combination with FIG. 9, when a cross beam 10 suffers from horizontal swing, for example, when an end portion of the cross beam 10 swings rightwards, one end of the first panel 1 parallel and level to the second panel 3 is defined to be an embedded end, and one end of the first panel 1 extending out from the longitudinal seam is defined to be an extended end. At this point, two elastic components 6 close to the extended end are compressed, and two elastic components 6 close to the embedded end are released. By releasing the elastic force of the two elastic components 6 close to the extended end, in combination with tightening the elastic force of the two elastic components 6 close to the embedded end, the end portion of the cross beam 10 can be supported to swing leftwards so as to restore. When the cross beam 10 is twisted, for example, when the cross beam 10 is twisted clockwise, two elastic components 6 close to an upper end of the first panel 1 are compressed and two elastic components 6 close to a lower end of the first panel 1 are released. By releasing the elastic force of the two elastic components 6 close to the upper end of the first panel 1, in combination with tightening the elastic force of the two elastic components 6 close to the lower end of the first panel 1, the cross beam 10 can be supported to rotate counter-clockwise so as to restore.

Obviously, the above embodiments are merely examples for clarity and are not limitations on the embodiments. Those of ordinary skill in the art can also make other variations or changes in different forms on the basis of the above description. It is not necessary or possible to give examples for all embodiments here. The obvious variations or changes derived therefrom are still within the protection scope of the present disclosure.

What is claimed is:

1. A longitudinal seam caulking and monitoring restore device, comprising:
    a first panel, on which a plurality of guide seats are arranged;
    a second panel, which is arranged to be opposite to the first panel;
    stranded wires, which are wound on the guide seats, wherein first ends of the stranded wires are connected to stranded wire end seats, the stranded wire end seats are fixedly connected to the second panel, second ends of the stranded wires extend out of a space between the second panel and the first panel and are connected to fastening devices, and the fastening devices are capable of tightening and releasing the stranded wires;

four elastic components, wherein the elastic components are arranged between the first panel and the second panel and are respectively close to corners of the second panel, first ends of the elastic components are fixedly connected to the first panel, and second ends of the elastic components are fixedly connected to the second panel; and two groups of air columns, wherein a connection axis of one group of the two groups of air columns intersects another connection axis of the other group of the two groups of air columns to form a cross, each group of the air columns comprises two air columns, the first panel is provided with air channels corresponding to the respective air columns and air slots communicating with first ends of the air channels, the air columns are resilient hollow columns having first ends with openings and second ends being closed, the first panel is provided with first limit slots surrounding the air slots, the first ends of the air columns are embedded in the first limit slots and the openings are opposite to the air slots, the second ends of the air columns abut against the second panel, second ends of the air channels are provided with air nozzles, and the air nozzles are connected to air pressure gauges.

2. The longitudinal seam caulking and monitoring restore device according to claim 1, wherein each of the elastic components is correspondingly provided with one of the stranded wires, a center of the first end of each of the elastic components is provided with one of the guide seats, a center of the second end of each of the elastic components is provided with one of the stranded wire end seats, and the stranded wires pass through the first ends of the elastic components, are wound around the guide seats and then are arranged inside the elastic components in a manner of being colinear with central axes of the elastic components.

3. The longitudinal seam caulking and monitoring restore device according to claim 2, wherein each of the elastic components comprises a spring seat and a spring, the spring seat is fixedly arranged on the first panel, one end of the spring is arranged on the spring seat, an opposite end of the spring is fixedly connected to the second panel, the spring seat comprises an annular body and a plurality of supporting legs connected to the annular body, and a space between two adjacent supporting legs of the plurality of supporting legs is configured for a corresponding stranded wire to pass through.

4. The longitudinal seam caulking and monitoring restore device according to claim 2, wherein each of the stranded wire end seats comprises a connection seat and a fixture fixedly connected to the connection seat, one end of each of the stranded wires is fixed in a corresponding one of the fixtures, and the connection seat is fixedly connected to the second panel.

5. The longitudinal seam caulking and monitoring restore device according to claim 2, wherein each of the guide seats is provided with a central through hole and at least two guide bottom holes communicating with the central through hole, the guide bottom holes are formed in one end of each of the guide seats connected to the first panel, each of the stranded wires passes through the central through hole and one of the guide bottom holes or passes through two of the guide bottom holes sequentially.

6. The longitudinal seam caulking and monitoring restore device according to claim 1, wherein the first panel is provided with mounting holes, and each of the fastening devices comprises:

a rotation shaft, which is rotatably arranged in each of the mounting holes, the second end of each of the stranded wires being fixedly connected to the rotation shaft; and a drive structure, which is connected to the rotation shaft, and capable of driving the rotation shaft to rotate around an axis thereof.

7. The longitudinal seam caulking and monitoring restore device according to claim 6, wherein the drive structure comprises:

a worm wheel, which is fixedly arranged on the rotation shaft;

a bracket, which is fixedly connected to the first panel and located on one side of the worm wheel;

a worm shaft, which is rotatably arranged in the bracket and engaged with the worm wheel; and a knob, which is connected to one end of the worm shaft and located outside the bracket.

8. The longitudinal seam caulking and monitoring restore device according to claim 1, wherein the first panel has a bubble level connected thereon, and a level tube of the bubble level is parallel to a long side of the first panel.

9. The longitudinal seam caulking and monitoring restore device according to claim 1, wherein the second panel is provided with second limit slots, and the second ends of the air columns are embedded in the second limit slots.

10. A longitudinal seam caulking restore method, applied to the longitudinal seam caulking and monitoring restore device of claim 1, and comprising:

operating the fastening devices to tighten the stranded wires such that a distance between the first panel and the second panel is reduced, and a distance between one side of the first panel away from the second panel and one side of the second panel away from the first panel is less than a width of a to-be-caulked longitudinal seam;

inserting the longitudinal seam caulking and monitoring restore device into the longitudinal seam, operating the fastening devices to release the stranded wires such that the first panel and the second panel respectively abut against side walls of the longitudinal seam under an action of the elastic components;

adjusting a position of the longitudinal seam caulking and monitoring restore device in the longitudinal seam such that that a bubble in the bubble level is centered;

operating again the fastening devices to release the stranded wires such that the first panel and the second panel respectively abut tightly against the side walls of the longitudinal seam under the action of the elastic components;

zeroing indications of the air pressure gauges;

after the longitudinal seam suffers from a change in position and shape, the longitudinal seam caulking restore method further comprising:

reading the indications of the air pressure gauges, and performing conversion according to the indications of the air pressure gauges to obtain a horizontal swing amplitude and a torsion angle of a structural member; and operating the fastening devices respectively to tighten or release the stranded wires to adjust deformations of the elastic components until the indications of the air pressure gauges become zero, so as to support shifting of the structural member in the longitudinal seam by means of the deformations of the elastic components at respective positions thereof, and to adjust the position of the structural member in the longitudinal seam.

\* \* \* \* \*